Patented May 2, 1933

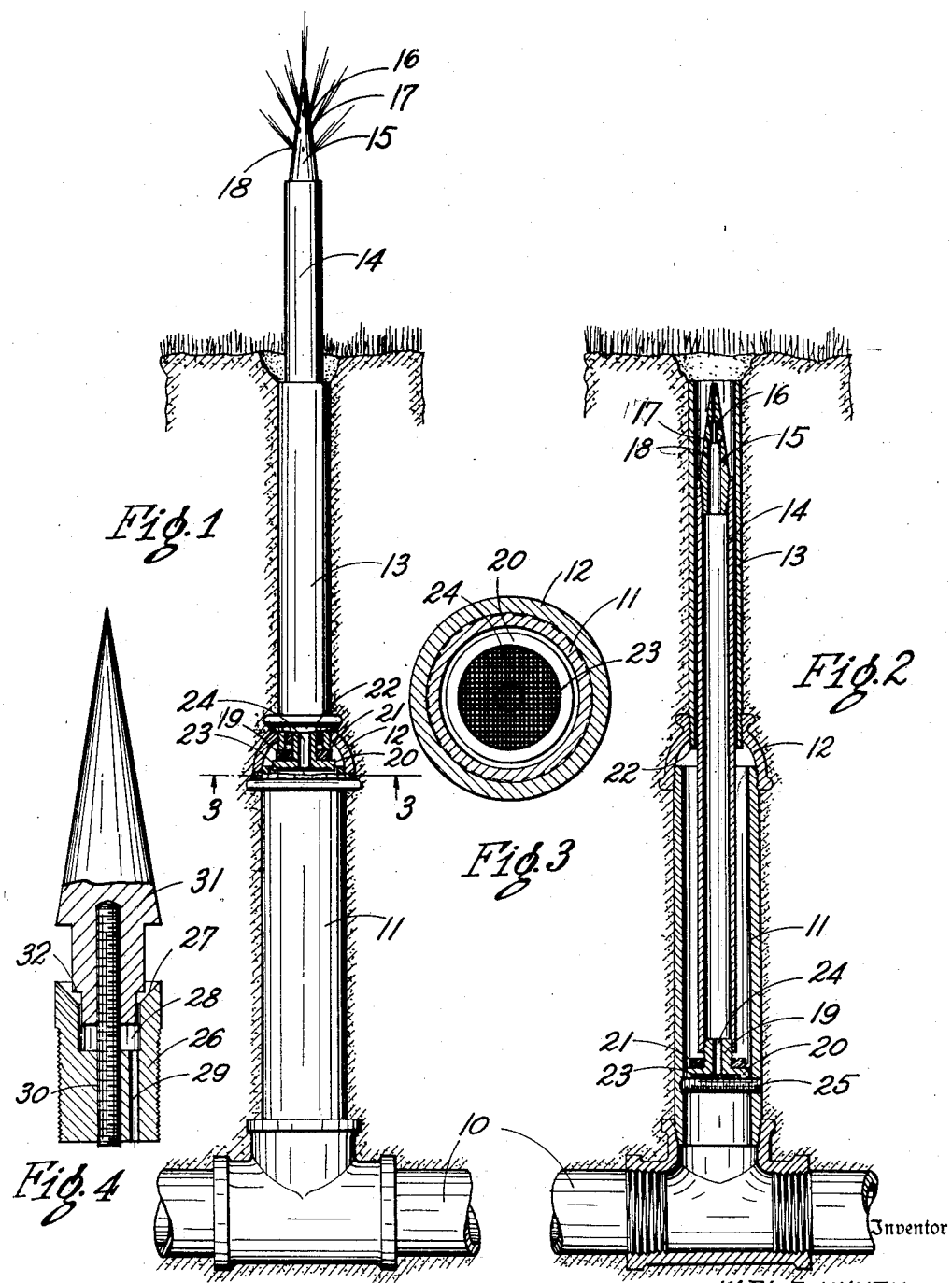

1,906,621

UNITED STATES PATENT OFFICE

KARL J. KNUTH, OF OLMSTEAD FALLS, OHIO

LAWN SPRINKLER

Application filed June 15, 1932. Serial No. 617,369.

This invention relates to lawn sprinkling systems and more specifically to an improved nozzle or sprinkling head adapted for use therewith.

In lawn sprinkling systems of the subterranean type difficulty has been experienced in maintaining the sprinkling heads in operative order when the grass is permitted to grow over the spray jet or spreader or when earth and other foreign matter accumulates within the recess in which the spray heads are located and thereby cause the opening to become obstructed. Further difficulties have been encountered when the spraying head or sprinklers are of the self sealing type, that is, of a valvular form which precludes the admission of air after the water is turned off, as such sprinkler heads retain water in the conduits and thereby cause considerable difficulty in draining the system in preparation for the winter season.

One of the objects of this invention is to provide a sprinkling head adapted for use in a subterranean sprinkling system which will obviate the difficulties heretofore described and minimize the cost of maintenance of such systems.

Another object of the invention is to provide a sprinkling head which is constructed for bodily movement and penetration through and above the matted grass or other obstructions which tend to impede the operation of the sprinkler.

A further object of the invention is to construct a sprinkling head which will be elevated, in its operative position, above the foliage of the surrounding shrubs or plants.

Another object of the invention is to construct a sprinkling head having a removable outlet control plug in the stem thereof so substitute outlets of variable size may be employed to effect the balance of the output of the sprinkler with the number of sprinkling units in the system.

Another object of the invention is to provide a sprinkler head having a stem portion constructed to be extended above the earth surface under the influence of the water pressure within the system and which will fall below the surface of the earth when the water is turned off.

Other objects more or less ancillary of the foregoing and the manner in which all the various objects are realized will appear in the following description which, considered in connection with the accompanying drawing, sets forth the preferred embodiment of the invention.

In the drawing—

Figure 1 is a vertical sectional view of a unit in a lawn sprinkling system including the sprinkler head embodying the present invention illustrated in its operative position.

Figure 2 is a vertical sectional view similar to the illustration in Figure 1 with further detail being shown by the sectional view through the medial axis of the device, the sprinkler head herein being shown in its retracted or inoperative position.

Figure 3 is a transverse sectional view taken upon a plane indicated by the line 3—3 in Figure 1.

Figure 4 is a longitudinal sectional view of a modified form of the spray nozzle adapted for use in conjunction with the spraying head embodying the present invention.

Referring to the drawing the conduit 10 is laid in the ground so as to afford a suitable fall or inclination toward the supply main and the control valve therefor, which, as is customary, is provided with an air vent to effect the drainage of the system. The sprinkling system comprises a plurality of spaced vertically disposed stand pipes or accumulating chambers 11 which are united with the conduit 10 by pipe T's or elbows in the usual manner. Upon the end of the accumulating chamber 11 there is a reduction coupling 12 which retains a sleeve 13 proportioned to extend within relatively short distance from the earth's surface. Within the sleeve 13 there is a plunger or tubular stem 14, the outer end thereof being provided with a tip 15, conical in form and drilled with a plurality of minute openings spaced to provide the suitable spread of the spraying jets. These outlets are preferably drilled at divergent angles, for instance, the tip is coaxially drilled at its outer end while the uppermost series 16 is disposed at an angle of 15°, the centrally located series 17 at an angle of 30° and the lower openings 18 arranged at an angle of 45° with the medial axis of the tip.

The stem 14 is formed to slide freely within the sleeve or casing 13 which is of adequate length to guide and support the stem when it is elevated or extended in its operative position. The inner portion of the stem is provided with a plug 19 having a flange 20 slightly less in diameter than the bore of the accumulating chamber 11. Upon the upper face of the flange there is a washer 21, preferably formed of rubber, and adapted for seated engagement with the end of the sleeve 13 which is extended within the chamber 11 to form a shoulder or valve seat 22. The inner face of the plug 19 is counterbored to receive a screen or wire gauze disc 23 which is provided to preclude the admission of rust or other foreign matter through the aperture 24 and into the interior of the stem 14. Adjacent the lower end of the accumulating chamber there is a pin 25 transversely disposed to the axis of the chamber 11 and provided to support the stem 14 when the spray nozzle is retracted below the earth's surface in its inoperative position.

A spray tip of an alternate form is shown in Figure 4. This structure embodies a plug 26 adapted to be retained within the stem 14. The upper surface of the plug is formed with an angulated seat 27 which merges with a chamber 28 having a passageway 29 leading therefrom for communication with the interior of the stem 14. In the central portion of the plug there is a stud 30 upon the outer end of which there is screwed a tip 31. Adjacent the inner end of the tip there is a shoulder portion 32 formed to engage the valve seat 27 and thus form a baffle to effect a suitable spread of the water passing through the passageway 29 and the chamber 28.

In operation when the valve controlling the flow of water through the conduit 10 is opened the water pressure will impinge on the flanged plug 19 and cause the stem 14 to be driven upwardly until the washer 21 is seated upon the shoulder 22. The stem will be held thus elevated during the sprinkling operation due to the restricted outlet passage and the further restriction in the openings in the spray tip 15. When the water is turned off and the pressure within the chamber 11 is released the stem will fall by gravity upon the supporting pin 25.

By the provision of the axial opening in the end of the spray tip a fine stream of water will be emitted when the water pressure is applied even though the stem 14 fails to be elevated beyond the surface of the earth during the sprinkling operation. Such stream of water will indicate the position of the sprinkling head so that the unit may be readily located and repaired.

The stem 14 and the members coordinated therewith may be proportioned so that the sprayer head when elevated by the application of the water pressure, will accommodate the application of water upon the tops of the adjacent plants and shrubs. Obviously no structural modification in the sprinkler head need be made to accomplish this advantage save the modification of the lineal dimensions of the stem and its appurtenances. The stem 14 may be keyed to the casing 13 to prevent the rotation thereof and the openings 16, 17 and 18 may be arranged within a limited circumferential portion of the tip when it is desired to use the sprinkling head adjacent a sidewalk or some area which should be shielded from the spray.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

I claim:

1. In an underground sprinkling system a tubular riser having a reduced end section, a shoulder formed on the interior of the riser at the point of reduction, a tubular stem arranged for reciprocative movement within the riser and guided in the said end section, a flanged plug mounted upon the lower end of said stem, the flange being of greater diameter than the end section, a gasket mounted upon said flanged portion of said plug and adapted to provide sealing engagement with the said shoulder, a tip mounted upon the end of the stem and tapered to pierce vegetation adjacent the mouth of the riser, said tip being formed with a restricted opening therein, a cross pin in said riser to arrest the movement of the stem in its retracted position, said plug having an opening therein for the admission of fluid within the stem, the said opening being so restricted as to cause the stem to be extended when fluid pressure is applied upon the face of the plug and to prevent the ready escapement of fluid within the stem when fluid pressure is relieved whereby the weight of the fluid entrapped within the stem will assist the retractive movement of the stem.

2. In an underground sprinkling system a tubular riser having a reduced end section, a shoulder formed on the interior of the riser at the point of reduction, a tubular stem arranged for reciprocative movement within the riser and guided in the said end section, a flanged plug mounted upon the lower end of said stem, the flange being of greater diameter than the end section, a gasket mounted upon said flanged portion of said plug and adapted to provide sealing engagement with the said shoulder, a tip mounted upon the end of the stem adjacent the mouth of the riser, said tip being formed with a restricted opening therein, a cross pin in said riser to arrest the movement of the stem in its retracted position, said plug having an opening therein for the admission of fluid within the stem, the said opening being so restricted as to cause the stem to be extended when fluid pressure is applied upon the face of the plug and to prevent the ready escapement of fluid within the stem when fluid pressure is relieved whereby the weight of the fluid entrapped within the stem will assist the retractive movement of the stem.

In testimony whereof I hereunto affix my signature this 10th day of June, 1932.

KARL J. KNUTH.